(No Model.)

H. T. RUSSELL.
DIE FOR JOINING FELLIES FOR BICYCLE WHEELS.

No. 250,982. Patented Dec. 13, 1881.

WITNESSES
E. A. Phalen
W. C. Fogg

INVENTOR
Henry T. Russell,
By Charles E. Pratt,
Atty.

UNITED STATES PATENT OFFICE.

HENRY T. RUSSELL, OF HARTFORD, CONNECTICUT, ASSIGNOR TO THE POPE MANUFACTURING COMPANY, OF BOSTON, MASSACHUSETTS.

DIE FOR JOINING FELLIES FOR BICYCLE-WHEELS.

SPECIFICATION forming part of Letters Patent No. 250,982, dated December 13, 1881.

Application filed March 8, 1881. (No model.)

*To all whom it may concern:*

Be it known that I, HENRY T. RUSSELL, of the city of Hartford, in the State of Connecticut, have invented certain new and useful Improvements in Dies for Joining Fellies for Bicycle-Wheels, of which the following is a specification.

Hitherto great difficulty has been found in uniting two ends of metal having curvilinear surfaces so as to insure strength and preserve at the same time evenness of form and finish; and for uniting bicycle-wheel rims, for instance, in which a definite size or circumference must be preserved, as well as a transverse concavity and convexity and a longitudinal curvation or truth of circumference, welding has been practically impossible, and resort has been had to brazing, which is open to objections.

The object of my invention is to overcome these difficulties and furnish a practically efficient, rapid, and economical way of forge-welding such articles into union with their proper form, proportion, and finish; and the nature thereof will appear from the following description, taken in connection with the drawings, in which the same letters represent the same parts in different views of a process and machinery for welding bicycle-rims embodying my improvements.

Figures 1, 4:
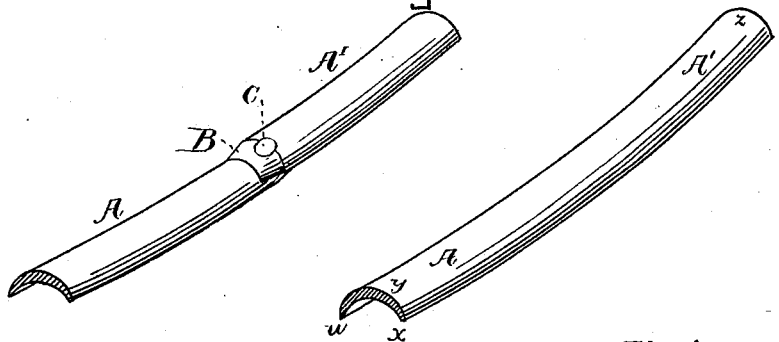

A A' in Figure 1 are ends of the felly, which is crescent-formed in cross-section, with the concave side outward to receive the tire of the wheels, the ends being chamfered or tapered, as at B, and brought together and held by a rivet, C, in proper position and so as to leave the whole felly of proper size for welding.

Figure 2:
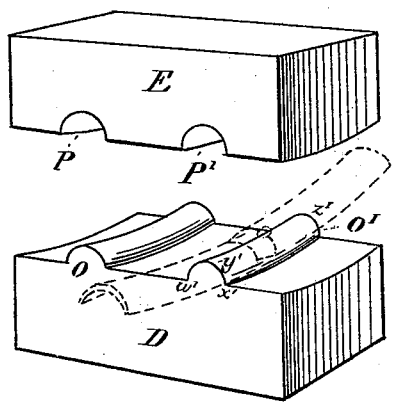

D and E in Fig. 2 are dies to be operated in a drop-forge or power hammer, of which D is the lower or anvil die.

O O' are ribs or cameos on the upper face of die D. O' is convex from $w'$ to $x'$ and concave from $y'$ to $z'$, the curves corresponding to those desired in the shape of the fellies $w\ x\ y\ z$ in Fig. 4.

Figure 3:
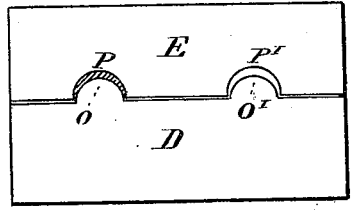

In the upper or hammer die, E, are grooves or intaglio P P', corresponding in curvature nearly to that of the ribs O O', but so constructed that when the dies are brought together, as shown in elevation in Fig. 3, a space shall be left between O and P exactly the desired shape of the segment of the felly which may be within the dies, and the space between O' and P' shall be a little freer or larger. These dies being placed in position for use and the parts A A' brought together and riveted, as shown in Fig. 1, I heat the latter at their juncture, using borax or other substance, as in ordinary welding, and when they are ready to weld I place them in position on the rib O' of the anvil-die D, as shown by the dotted lines in Fig. 2, and cause them to be struck one or more blows with the hammer E and die P', by which they are welded together and brought approximately to the shape required. Then, either with or without reheating, as may be required, the united segment is transferred to the rib O, and by more blows from the hammer E and its die P the perfected shape, with uniform dimensions and curvature, is given the welded segment, and it is taken out, as shown in Fig. 4.

It is obvious that in this way a continuous and uniform felly or rim is produced by welding instead of brazing; that by this process the uniting of two ends of metal having curved surfaces in two or more directions is rendered practicable, rapid, and economical, and that the welding-dies may be varied in the conformation of their working-faces to suit any form of work desired, and be made to take the place of hammer and swage-block and to do work impossible with the latter.

I claim as new and of my invention—

The welding-dies D and E, with ribs O O' and recesses P P', constructed and adapted to operate substantially as shown and described.

H. T. RUSSELL.

Witnesses:
GEO. H. DAY,
E. J. POST.